United States Patent
Yang

(10) Patent No.: US 6,623,882 B2
(45) Date of Patent: Sep. 23, 2003

(54) BIPOLAR PLATE FOR A FUEL CELL

(75) Inventor: Jefferson YS Yang, Orange, CA (US)

(73) Assignee: Asia Pacific Fuel Cell Technologies, Ltd., Taipei (TW)

( * ) Notice: Subject to any disclaimer, the term of this patent is extended or adjusted under 35 U.S.C. 154(b) by 40 days.

(21) Appl. No.: 09/938,681

(22) Filed: Aug. 24, 2001

(65) Prior Publication Data

US 2002/0150807 A1 Oct. 17, 2002

(30) Foreign Application Priority Data

Apr. 16, 2001 (TW) .................................... 90109032 A

(51) Int. Cl.$^7$ ................................................ H01M 8/04
(52) U.S. Cl. ........................... 429/39; 429/34; 429/38
(58) Field of Search ......................... 429/34, 38–39

(56) References Cited

U.S. PATENT DOCUMENTS

| | | | | |
|---|---|---|---|---|
| 4,533,455 A | * | 8/1985 | Balko ................... | 204/279 |
| 4,769,297 A | * | 9/1988 | Reiser .................. | 429/17 |
| 5,795,665 A | * | 8/1998 | Allen ................... | 429/12 |
| 5,952,119 A | * | 9/1999 | Wilson .................. | 429/34 |
| 5,972,530 A | * | 10/1999 | Shelekhin ............... | 429/26 |
| 6,083,638 A | * | 7/2000 | Taniguchi ............... | 429/34 |
| 6,248,467 B1 | * | 6/2001 | Wilson .................. | 429/39 |
| 6,261,710 B1 | * | 7/2001 | Marianowski ............. | 429/34 |

FOREIGN PATENT DOCUMENTS

JP 358166667 * 10/1983 ............ H01M/8/02

* cited by examiner

Primary Examiner—Mark Ruthkosky
(74) Attorney, Agent, or Firm—Rosenberg, Klein & Lee

(57) ABSTRACT

This invention is related to a bipolar plate for a fuel cell, the bipolar plate comprises a plurality of groove type gas channels substantially parallel with one another, each of the gas channels has a cross section area defined by the walls thereof and an opening, each of the openings is provided with a reducing device to reduce the cross section area in the vicinity of the opening. This invention thus can increase the pressure difference between the inlet and outlet of the gas channels. Therefore, the gas channels of the bipolar plate will not be clogged by water droplets and the fuel cell can be operated with high efficiency.

7 Claims, 4 Drawing Sheets

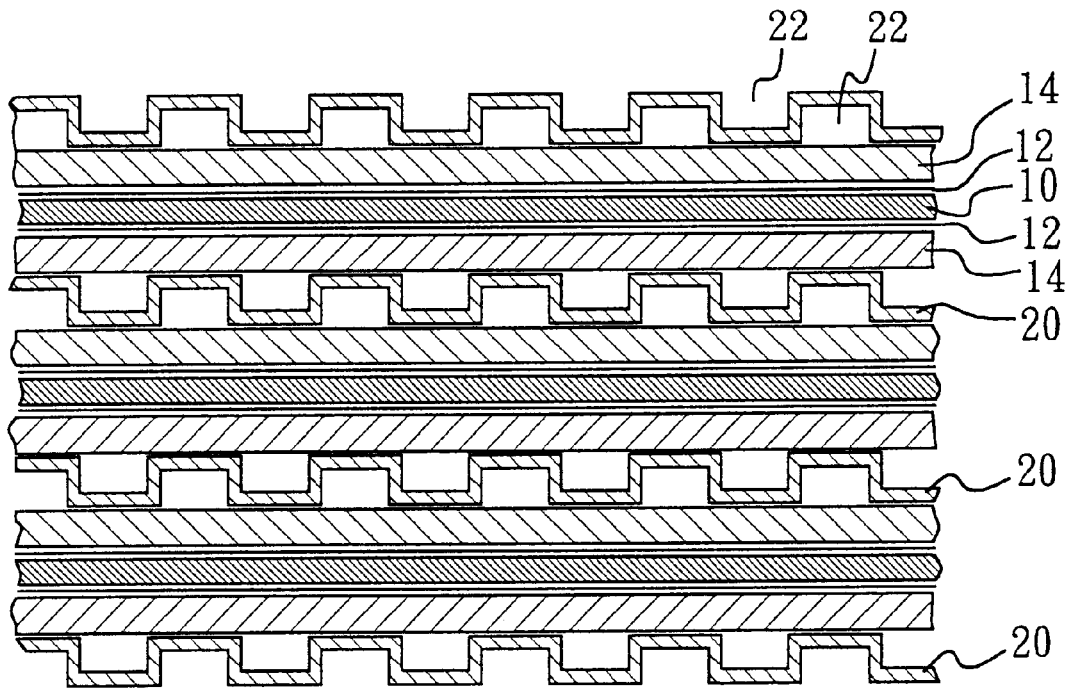
FIG. 6
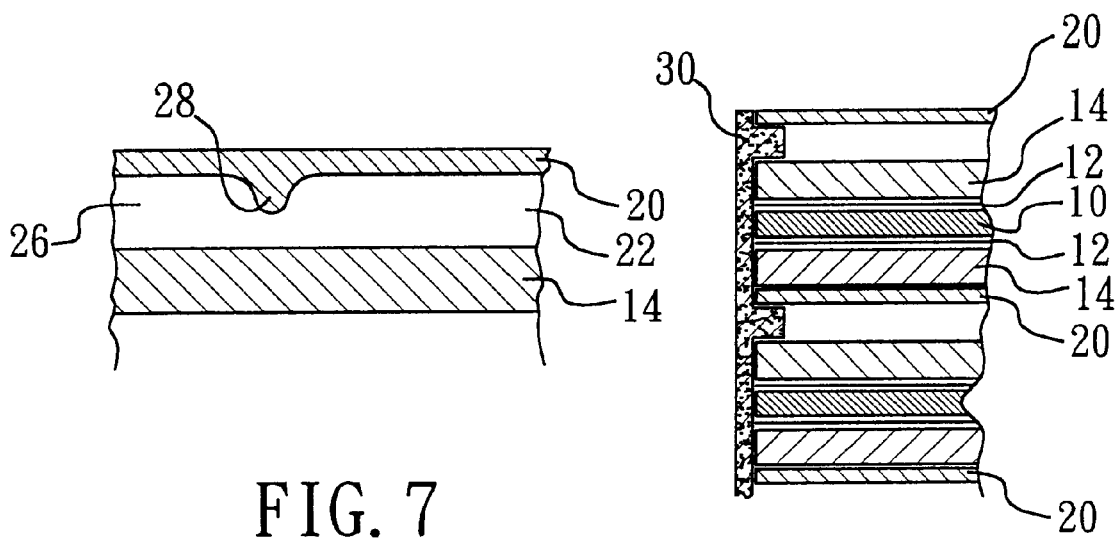
FIG. 7
FIG. 8

US 6,623,882 B2

BIPOLAR PLATE FOR A FUEL CELL

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention is related to a bipolar plate for a fuel cell, in particular, a bipolar plate with improved effect of water management, and most particularly, a bipolar plate with better water management effect utilized in a proton exchange membrane fuel cell. The bipolar plate provided by this invention involves simplified construction, therefore, the cast for manufacturing of the fuel cell is reduced and mass production of the fuel cell becomes feasible. Furthermore, the bipolar plate of this invention ensures that the fuel cell can be effectively operated under high efficiency.

2. Description of the Related Art

With the rapid growth of human civilization, the consumption of traditional energy sources, such as coal, oil and natural gas, increases rapidly. With the rapid growth of human civilization, the consumption of traditional energy sources, such as coal, oil and natural gas, increases rapidly. This has resulted in a serious pollution to the global environment, as well as, various environmental problems such as global warming and acid rain. It is now recognized that the natural energy resources are limited and, if the present rate of consumption continues, all existing energy sources will be exhausted in the very future. Accordingly, many developed countries are dedicated to the research and development of new and replaceable energy sources. The fuel cell is one of the most important and reasonably priced choices for an energy source. Compared with the traditional internal combustion engine, the fuel cell has many advantages such as high energy transformation efficiency, clean exhaust, low noise, and no consumption of gasoline.

In brief, fuel cell is an electrical power generation device by the electrochemical reaction of hydrogen and oxygen. In basic term, the reaction is a reverse reaction of the electrolysis of water, to transfer the chemical energy into the electrical energy. The basic construction of a fuel cell, for example a proton exchange membrane fuel cell, comprises a plurality of cell units. The construction of the cell unit is generally illustrated in FIG. 1. It comprises a proton exchange membrane (PEM) 10 at the middle with the two sides thereof provided with a layer of catalyst 12 and each of the two outsides of the catalyst 12 being further provided with a gas diffusion layer (GDL) 14. An anode plate 16 and a cathode plate 18 are further provided at the outermost sides adjacent to the GDL 14. After tightly combining all the above elements together, a cell unit is formed. For practical application of the fuel cell, a plurality of the above cell units are stacked and serially connected to provide sufficient power, as illustrated in FIG. 2. Therefore, two adjacent cell units can share a common polar plate 20, as illustrated in FIG. 3, which serves as the anode and the cathode for the two adjacent cell units, respectively. Accordingly, such a polar plate 20 is usually referred to as a bipolar plate.

Generally, as illustrated in FIG. 3, the two sides of the bipolar plate 20 are provided with many groove type gas channels 22 for delivering the gases for reaction, such as hydrogen and air (to provide oxygen), as well as moving the reactants, such as water droplet or vapor, out of the bipolar plate 20.

It should be noted that the gas within the bipolar plate 20 of the fuel cell must contain substantial moisture so that the ion from the chemical reaction can be carried by the moisture to pass through the PEM 10 for proton conduction. If the amount of moisture contained in the gas is less than the required amount, the PEM will be dehydrated, which will increase the electrical resistance and lower the voltage of the fuel cell and the life of the fuel cell will be shortened. Accordingly, the fuel cell might include a humidifier to increase the moisture content in the gas to overcome the above problem. However, if the amount of moisture contained in the gas is over the required amount, the gas channels 22 of the bipolar plate 20 for transporting gas might be clogged, as shown in FIG. 4. As a result, the gas cannot keep transporting, and the chemical reaction of the fuel cell will be terminated. Thus, excessive amount of moisture contained in the gas will also impair the performance of the fuel cell. In conclusion, water management of the gas in the bipolar plate is critical to the performance of the fuel cell.

One of the most effective measures to prevent the gas channels 22 of the bipolar plate 20 from being clogged by a water droplet 24, is to increase the pressure difference ($\Delta P$) between the inlet and outlet of the gas channels 22. When the gas channels 22 is clogged by a water droplet 24, as illustrated in FIG. 4, the gas within the gas channels 22 can no longer be transported. Therefore, the pressure at one side of the water droplet 24 will be substantially the same with the pressure at the inlet of the gas channels 22, and the pressure at the other side of the water droplet 24 will be substantially the same with the pressure at the outlet of the gas channels 22. Because such a $\Delta P$ will be applied on both sides of the water droplet 24 when it clogs the gas channels 22, increased $\Delta P$ between the inlet and outlet of the gas channels 22 will shatter and blow the water droplet 24 out of the gas channels 22.

The conventional measure to increase the $\Delta P$ between the inlet and outlet of the gas channels is to decrease the diameter of the gas channels and/or increase the length of the gas channels which thereby is in a slender serpentine formation, as shown in FIG. 5. The reason for providing such a slender serpentine formation is that the wall of the gas channels will introduce frictional resistance to the gas when it transports in the gas channels. Thus, a larger $\Delta P$ between the inlet and outlet of the gas channels can be obtained. Nevertheless, this conventional measure needs to manufacture the gas channels into a single elongated serpentine formation with very small diameter. Such a formation will significantly increase the difficulty and costs for producing the bipolar plate 20. Additionally, such a slender serpentine gas channel will cause turbulence or other unexpected disturbance to the transportation of gas and thus, the chemical reaction and the efficiency of the fuel cell will be affected.

BRIEF SUMMARY OF THE INVENTION

The primary object of this invention is to overcome the disadvantages of the conventional technique and to provide a bipolar plate for a fuel cell. The bipolar plate has a plurality of groove type gas channels parallel with one another. Each of the gas channels has a cross section defined by the walls thereof, and each of the gas channels has an opening. In the vicinity of each of the openings is provided with a reducing device to reduce the area of the cross section. By reducing the area of the cross section of the groove type gas channels, this invention can increase the pressure difference between the inlet and outlet of the gas channels. Thus, the gas channels of the bipolar plate will not be clogged by water droplets and the fuel cell can be operated with high efficiency.

The structures and characteristics of this invention can be realized by referring to the appended drawings and explanations of the preferred embodiments.

BRIEF DESCRIPTION OF THE SEVERAL VIEWS OF THE DRAWINGS

FIG. 6 is a schematic cross sectional view of a bipolar plate according to a preferred embodiment of this invention;

FIG. 7 is an enlarged schematic cross sectional view showing portion of the bipolar plate according to a preferred embodiment of this invention; and FIG. 8 is an enlarged schematic cross sectional view showing portion of the bipolar plate according to another preferred embodiment of this invention.

DETAILED DESCRIPTION OF THE INVENTION

Figure 1:
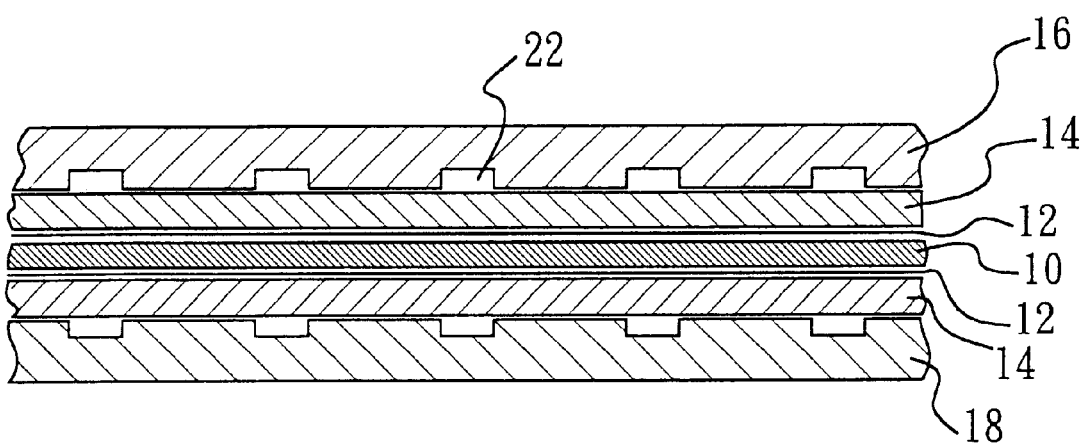
FIG. 1 is a schematic cross sectional view showing the structure of a cell unit of a conventional fuel cell.
Figure 2:
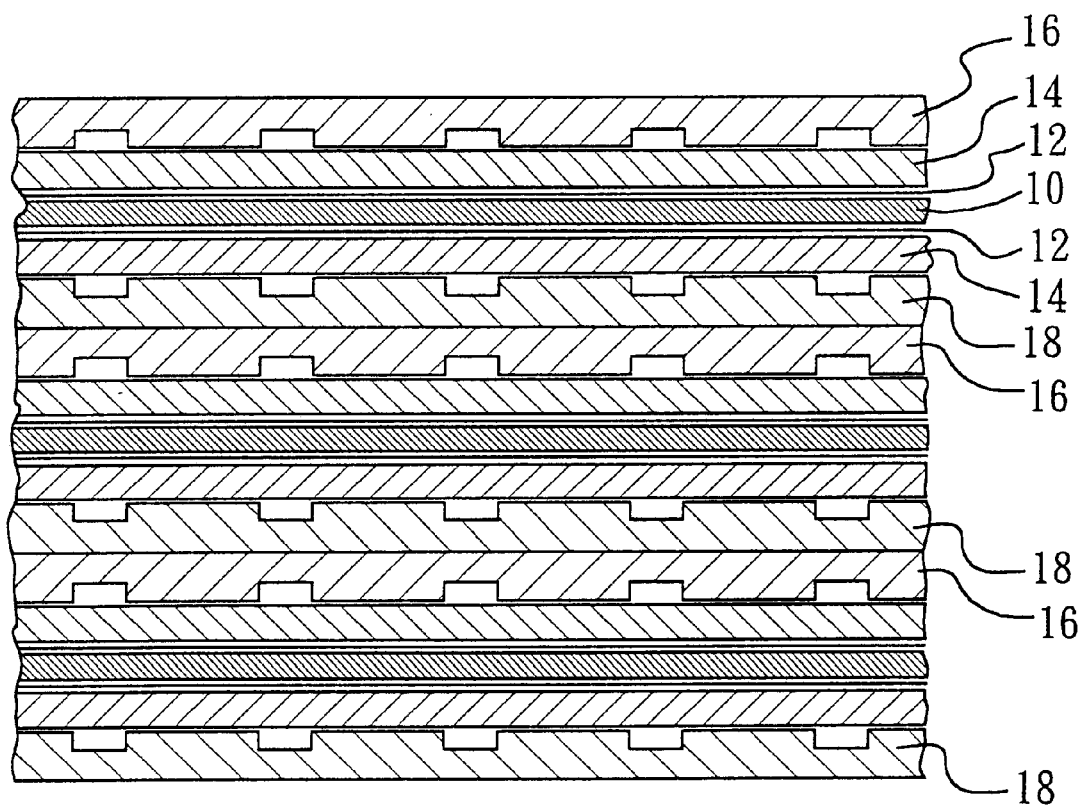
FIG. 2 is a schematic cross sectional view showing the structure of combining a plurality of the conventional cell units.
Figure 3:
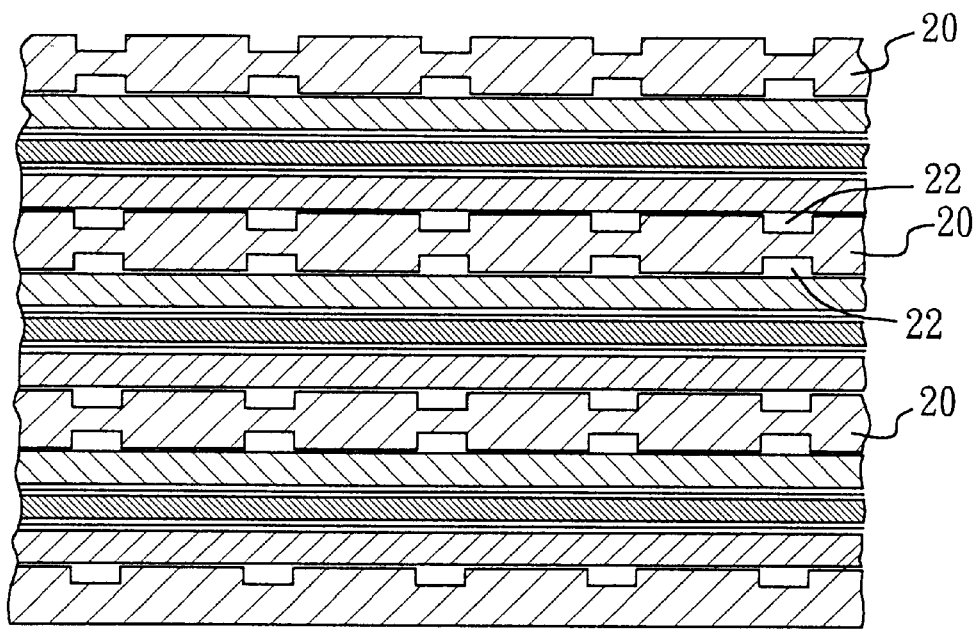
FIG. 3 is a schematic cross sectional view showing a portion of the conventional fuel cell.
Figure 4:
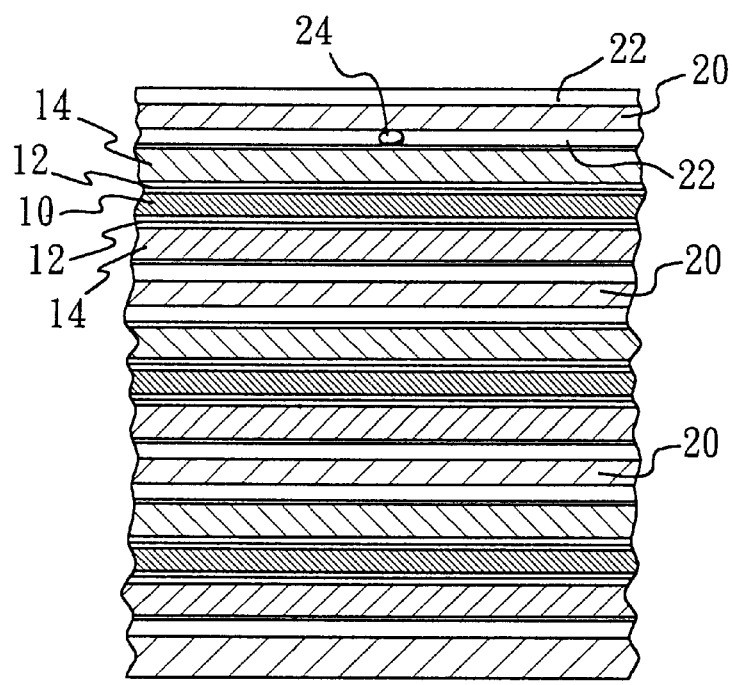
FIG. 4 is a schematic cross sectional view taken along line 4—4 of FIG. 3.
Figure 5:
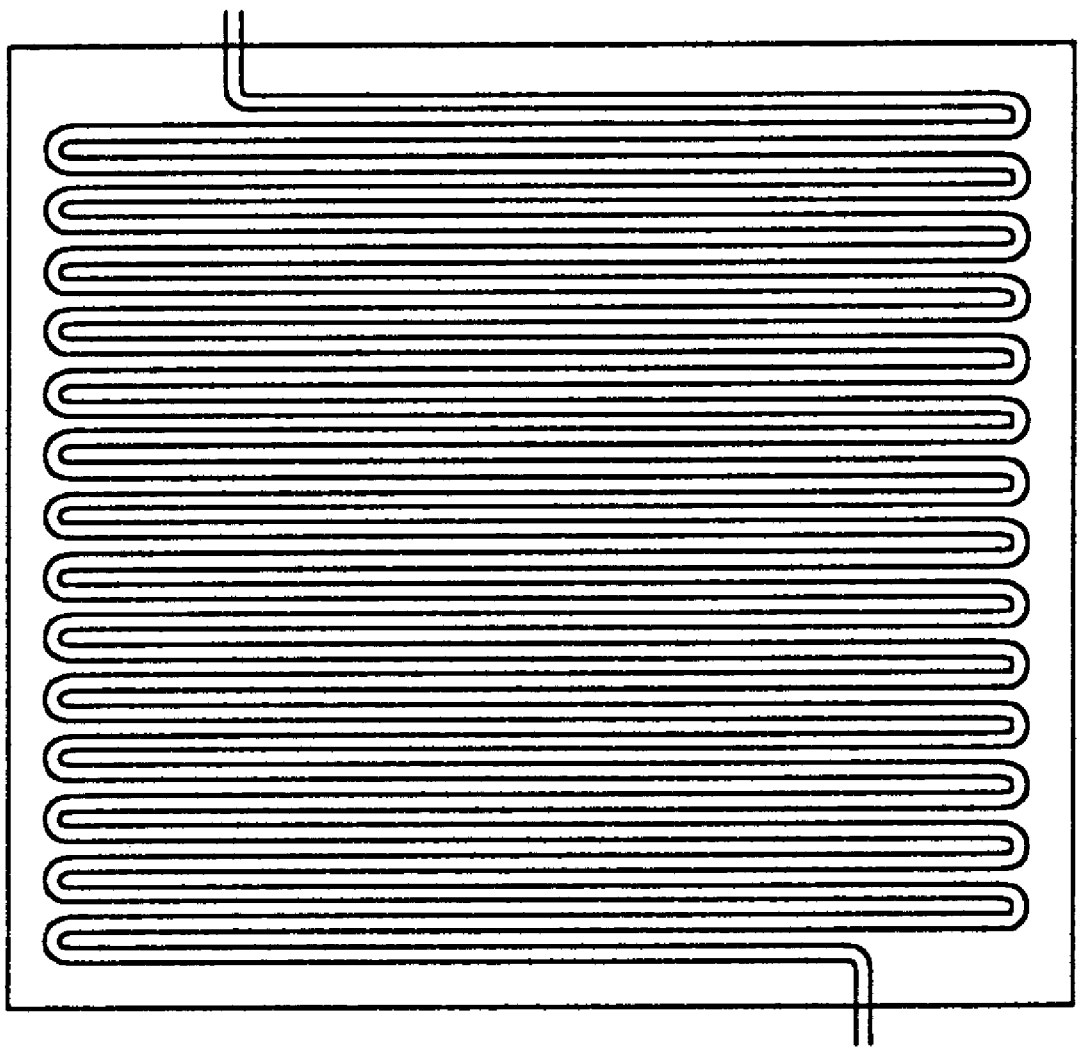
FIG. 5 is a schematic plan view of a conventional bipolar plate.

The bipolar plate for a fuel cell of this invention is primarily focused on the bipolar plate for a proton exchange membrane fuel cell. The bipolar plate 20, as illustrated in either FIG. 3 or FIG. 6 with different configuration, has a plurality of substantially parallel groove type gas channels 22. Each of the gas channels 22 has a cross section area defined by the walls and the GDL 14 and this cross section area of each of the gas channels 22 is substantially even. The gas channel 22 also has an opening 26. In one of the preferred embodiment of this invention, as shown in FIG. 7, the wall of the bipolar plate 20 is inwardly extended in the vicinity of the opening 26 to form a protuberance 28, so that the cross section area is reduced. According to fluid dynamics, the reduction of the cross section area of the gas channels 22 will increase the pressure difference or pressure drop ΔP between the two sides of the protuberance 28. Thus, this invention utilizes a very simple manufacture process to reduce the cross section area available for transporting gas in the gas channels 22 so that no gas channels 22 will be clogged by water droplet.

FIG. 8 shows another preferred embodiment according to this invention, in which a porous material 30 is placed in the opening 26. The porous material 30 can be integrally formed with parts protruding into each of the openings 26. As a result, the cross section area available for gas transportation in the opening 26 of the gas channels 22 is significantly reduced. Preferably, the porous material 30 has interconnected spherical voids so that the gas can pass through. Moreover, the porous material 30 is preferably hydrophobic, so that the voids of the porous material 30 will not be clogged by the moisture contained in the gas. Hydrophobic material will also prevent rust or growth of microorganisms. The porous material 30 can be made of polyester according to the preferred embodiment of this invention.

By the configuration of this invention, more significant pressure drop ΔP, for example, 5 to 10 psi, can be produced in the gas channels 22. Thus, when the gas channel 22 is clogged by water droplets, such ΔP will shatter and blow the water droplets out of the gas channels 22.

This invention is related to a novel creation that makes a breakthrough to conventional art. Aforementioned explanations, however, are directed to the description of preferred embodiments according to this invention. Various changes and implementations can be made by persons skilled in the art without departing from the technical concept of this invention. Since this invention is not limited to the specific details described in connection with the preferred embodiments, changes to certain features of the preferred embodiments without altering the overall basic function of the invention are contemplated within the scope of the appended claims.

What is claimed is:

1. A fuel cell comprising:

at least one bipolar plate defining a plurality of elongate gas channels transversely offset from one another, each of the gas channels being of a substantially even cross sectional area and having an opening; and a plurality of reducing devices each disposed in the vicinity of the opening of one gas channel, each reducing device projecting into one gas channel to reduce the cross sectional area thereof.

2. The fuel cell according to claim 1, wherein the reducing devices include a plurality of protuberances each being disposed within one of the gas channels and integrally formed with the bipolar plate.

3. The fuel cell according to claim 1, wherein the reducing devices are made of a porous material, and are placed at the openings.

4. The fuel cell according to claim 3, wherein the reducing devices are integrally formed.

5. The fuel cell according to claim 3, wherein the porous material has interconnected spherical voids.

6. The fuel cell according to claim 3, wherein the porous material is hydrophobic.

7. The fuel cell according to claim 6, wherein the porous material is polyester.

* * * * *